United States Patent
Shimokawa

(10) Patent No.: US 8,012,920 B2
(45) Date of Patent: Sep. 6, 2011

(54) LUBRICANT FOR MAGNETIC DISKS, METHOD FOR PRODUCING THE LUBRICANT USED IN THE MAGNETIC DISKS, AND METHOD FOR MANUFACTURING THE SAME

(75) Inventor: Koichi Shimokawa, Tokyo (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 918 days.

(21) Appl. No.: 10/586,150

(22) PCT Filed: Jan. 12, 2005

(86) PCT No.: PCT/JP2005/000214
§ 371 (c)(1),
(2), (4) Date: Oct. 18, 2006

(87) PCT Pub. No.: WO2005/068589
PCT Pub. Date: Jul. 28, 2005

(65) Prior Publication Data
US 2007/0298982 A1 Dec. 27, 2007

(30) Foreign Application Priority Data
Jan. 14, 2004 (JP) .................................. 2004-006315

(51) Int. Cl.
C10M 147/04 (2006.01)
C10M 145/24 (2006.01)
C10M 169/04 (2006.01)
C07C 43/17 (2006.01)
(52) U.S. Cl. .................. 508/582; 508/182; 568/615
(58) Field of Classification Search .................. 508/182, 508/582; 568/615
See application file for complete search history.

(56) References Cited

U.S. PATENT DOCUMENTS
6,099,937 A * 8/2000 Gui et al. ................. 428/141
2003/0175470 A1* 9/2003 Ishida et al. ............... 428/65.8

FOREIGN PATENT DOCUMENTS
EP     214672 A  *  3/1987
JP   62-66417 A     3/1987
(Continued)

OTHER PUBLICATIONS

Fomblin Z Derivatives—Product Data sheet<http://www.solvaysolexis.com/static/wma/pdf/5/4/3/4/fom_thin.pdf> retrieved from the internet on Jan. 29, 2010.*

(Continued)

*Primary Examiner* — James C Goloboy

(57) ABSTRACT

The present invention provides a lubricant for forming a lubricating layer which is useful in preventing fly and stiction and/or corrosion at an extremely small flying height of 10 nm or less, which is prevented from migrating at a high rotational speed of 5400 rpm or more, which has high adhesion, and which is suitable for a load/unload method. A crude lubricant containing at least one perfluoropolyether is degassed and then purified. Alternatively, a liquid crude lubricant containing at least one perfluoropolyether is purified by vaporizing the crude lubricant and then liquefying the vapor of the perfluoropolyether within a distance less than the mean free path of molecules of the perfluoropolyether. A magnetic disk is prepared in such a manner that a carbonaceous protective layer is formed above a substrate and a lubricating layer is formed on the protective layer using of the lubricant. The lubricant contains the perfluoropolyether and has a molecular weight distribution of 1.3 or less.

11 Claims, 2 Drawing Sheets

FOREIGN PATENT DOCUMENTS

| | | | |
|---|---|---|---|
| JP | 9-282642 A | 10/1997 |
| JP | 10-143838 A | 5/1998 |
| JP | 2000-235709 A | 8/2000 |
| JP | 2001-152176 A | 6/2001 |
| JP | 2001-164279 A | 6/2001 |
| JP | 2001-229524 A | 8/2001 |
| JP | 2002-25046 A | 1/2002 |
| JP | 2002025046 A | * | 1/2002 |
| JP | 2004-103074 A | 4/2004 |
| JP | 2004-253110 A | 9/2004 |
| JP | 2004-319058 A | 11/2004 |

OTHER PUBLICATIONS

Office Action dated Mar. 24, 2011 in China Patent Application No. 200910001714.3, 13 pages.

Written Opinion and Search Report dated Nov. 25, 2010 in Singapore Patent Application No. 200902359-9, 17 pages.

* cited by examiner

[FIG. 1]
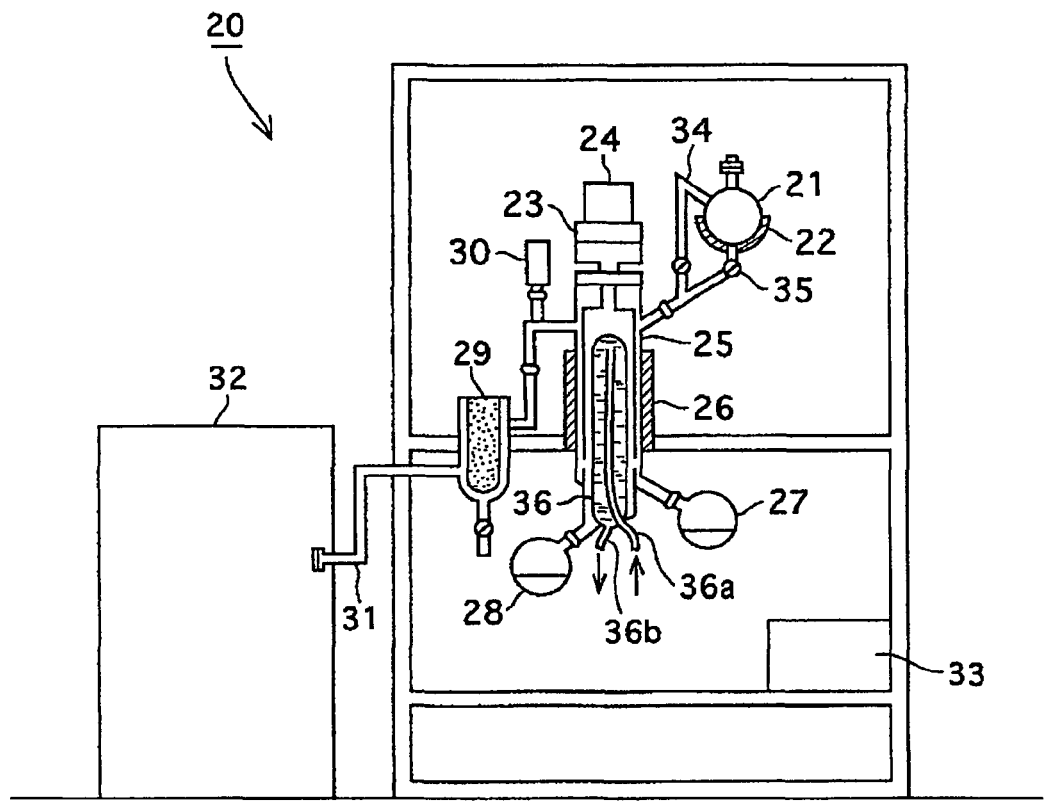
[FIG. 2]
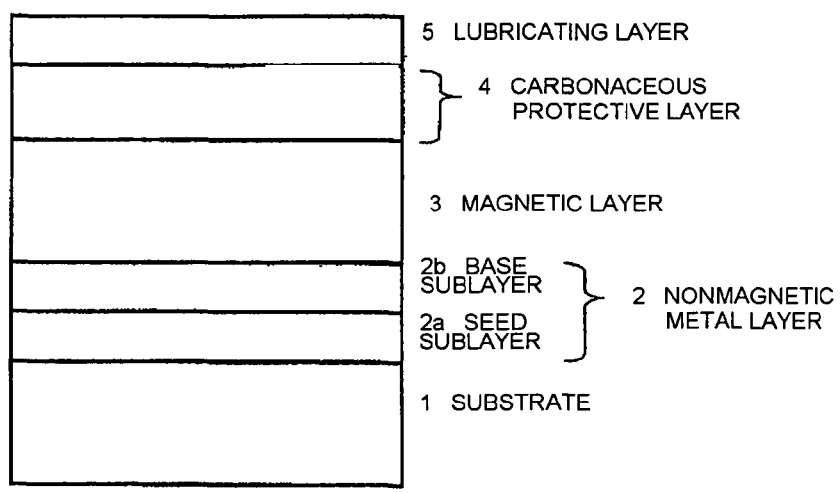

[FIG. 3]
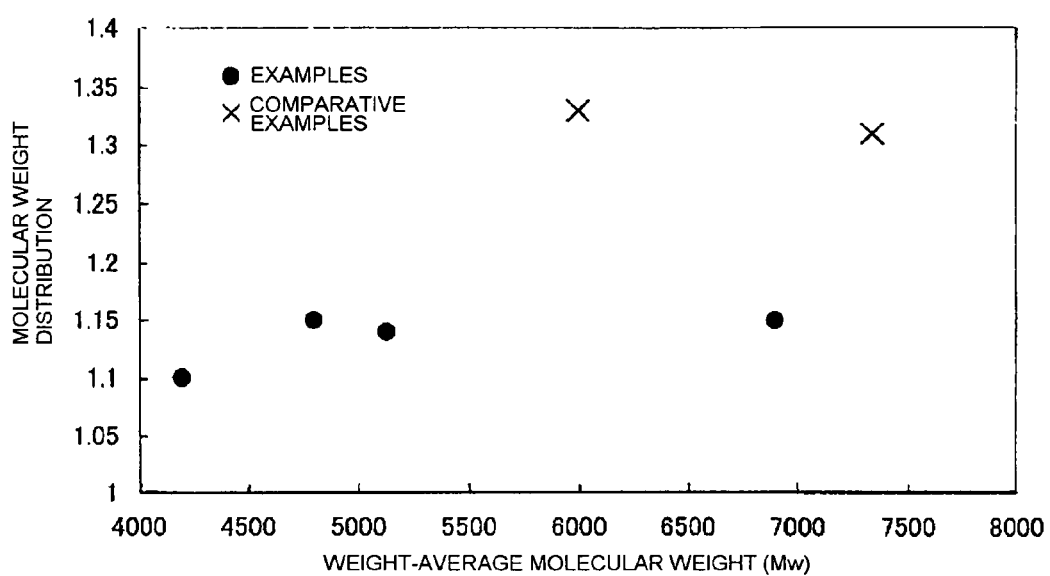

LUBRICANT FOR MAGNETIC DISKS, METHOD FOR PRODUCING THE LUBRICANT USED IN THE MAGNETIC DISKS, AND METHOD FOR MANUFACTURING THE SAME

TECHNICAL FIELD

The present invention relates to a lubricant for forming lubricating layers on magnetic disks installed in magnetic disk devices such as hard disk drives, a method for producing the lubricant used in the magnetic disk, and a method for manufacturing the same.

BACKGROUND ART

In magnetic disk drives such as hard disk drives (HDDs), the following method has been used: a CSS (Contact Start and Stop) method in which a magnetic head is kept in contact with a contact sliding zone (CSS zone) located in an inner region of a face of a magnetic disk during halt, the magnetic head is slid on the CSS zone and then lifted therefrom during startup operation, and data is then recorded on or reproduced from a recording/reproducing zone located outside the CSS zone. The magnetic head is moved from the recording/reproducing zone onto the CSS zone, slid on the CSS zone, and then stopped during shutdown operation. In the CSS method, startup operation and shutdown operation, during which contacting/sliding takes place, are referred to as CSS operation.

CSS-type magnetic disks need to have both CSS zones and recording/reproducing zones arranged in faces thereof. Furthermore, the magnetic disks need to have surface irregularities with a certain roughness such that magnetic heads are not stuck to the magnetic disks when the magnetic heads are brought into contact with the magnetic disks.

Japanese Unexamined Patent Application Publication (JP-A) No. 62-66417 (Patent Document 1) or the like discloses a magnetic recording medium coated with a perfluoroalkylpolyether, having the formula $HOCH_2—CF_2O—(C_2F_4O)_p—(CF_2O)_q—CH_2OH$, useful in reducing the damage on occurrence of contacting/sliding between a magnetic head and a magnetic disk during CSS operation.

Japanese Unexamined Patent Application Publication (JP-A) No. 9-282642 (Patent Document 2) and Japanese Unexamined Patent Application Publication (JP-A) No. 10-143838 (Patent Document 3) disclose magnetic recording media with high CSS durability. Furthermore, Japanese Unexamined Patent Application Publication (JP-A) No. 2001-164279 (Patent Document 4) discloses a magnetic recording medium having good sliding properties and high CSS durability due to a lubricant purified by a supercritical extraction method.

Patent Document 1: Japanese Unexamined Patent Application Publication (JP-A) No. 62-66417
Patent Document 2: Japanese Unexamined Patent Application Publication (JP-A) No. 9-282642
Patent Document 3: Japanese Unexamined Patent Application Publication (JP-A) No. 10-143838
Patent Document 4: Japanese Unexamined Patent Application Publication (JP-A) No. 2001-164279

DISCLOSURE OF THE INVENTION

Problems to be Solved by the Invention

In recent years, LUL (load/unload)-type magnetic disk drives tends to be substituted for CSS-type magnetic disk drives. In such an LUL-type magnetic disk drive, a magnetic head is placed on a slope, referred to as a ramp, located outside a magnetic disk during halt and moved from the ramp onto the magnetic disk after the start of the rotation of the magnetic disk during startup and recording or reproduction is then performed. This procedure is referred to as LUL operation. An LUL-type magnetic disk has a recording/reproducing zone wider than that of a CSS-type magnetic disk; hence, the LUL-type magnetic disk is preferable in view of an increase in data capacity. Furthermore, the LUL-type magnetic disk need not have any surface irregularities for CSS operation; hence, the LUL-type magnetic disk may have an extremely smooth face. This leads to a reduction in the flying height of an LUL-type magnetic head. Thus, the LUL-type magnetic head can record data with a high S/N ratio and is therefore preferable.

A reduction in the flying height of the LUL-type magnetic head requires that the LUL-type magnetic disk operates stably at an extremely small flying height of 10 nm or less. The flight of the LUL-type magnetic head over the LUL-type magnetic disk at such an extremely small flying height causes problems such as fly stiction and head corrosion.

Fly stiction is a problem that the flying behavior and height of a magnetic head are changed during flight, causing irregular fluctuations in reproduction output. The magnetic head is brought into contact with a magnetic disk during flight in some cases. This can cause head crush to occur, resulting in the breakage of the magnetic disk.

Head corrosion is a problem that the corrosion of elements included in the magnetic head interferes with recording or reproduction. This makes recording or reproduction impossible in some cases. Alternatively, the corroded elements become large and damage the magnetic disk during flight.

In recent years, in order to enhance the response speed of magnetic disk drives, the rotational speed of magnetic disks has been increased. The rotational speed of small-size magnetic disks, having a diameter of 2.5 inches, suitable for mobile use has been recently increased from about 4200 rpm to 5400 rpm or more, thereby enhancing the response speed.

The high-speed rotation of a magnetic disk causes a problem that a lubricating layer on a face of the magnetic disk partially migrates due to the centrifugal force generated by the rotation thereof, thereby causing the thickness of the lubricating layer to be nonuniform.

An increase in the thickness of an outer end region of the lubricating layer can cause fly stiction and/or head crush when a magnetic head flies across the outer end region thereof during LUL operation. A decrease in the thickness of an inner end region of the lubricating layer is liable to deteriorate lubricating properties and, as a result, often causes head crush.

The lubricating techniques disclosed in the Patent Document 1, 2, 3, or 4 have been developed to improve CSS operation. Hence, the application of the lubricating techniques to LUL-type magnetic disks causes the above problems. That is, the lubricating techniques cannot meet reliability requirements for current magnetic disks. This prevents an increase in the capacity, S/N ratio, and/or response speed of the LUL-type magnetic disks.

It is an object of the present invention to provide a lubricant for forming a lubricating layer which is useful in preventing fly stiction and/or corrosion at an extremely small flying height of, for example, 10 nm or less, which is prevented from migrating at a high rotational speed of, for example, 5400 rpm or more, and which has high adhesion and to provide a magnetic disk having a lubricating layer formed using such a lubricant. In particular, it is an object of the present invention to provide a lubricant for forming a lubricating layer suitable for a LUL (load/unload) method and to provide a magnetic disk suitable therefor.

Means for Solving the Problems

In order to achieve the object, the inventor has investigated the above problems, which are serious for current magnetic disks. The inventor has found out that the problems are probably caused to occur by a mechanism that will be mentioned below.

While a magnetic head is flying at an extremely small height of 10 nm or less, a lubricating layer on a face of a magnetic disk is repeatedly heated and cooled because air molecules on the lubricating layer are repeatedly subjected to adiabatic compression and expansion. This promotes the degradation of a lubricant contained in the lubricating layer.

The degradation of the lubricant increases the fluidity thereof to cause a reduction in the adhesion between the lubricating layer and a protective layer. The degraded lubricant having high fluidity migrates to the magnetic head close to the lubricating layer and deposits thereon, thereby disturbing the flying behavior of the magnetic head. This probably causes fly stiction.

In particular, a magnetic head including a recently developed NPAB (negative pressure air bearing surface) slider, that is, a negative pressure slider readily attracts the lubricant because of the generation of a negative pressure under the lower face of the magnetic head. This probably causes the migration and deposition of the lubricant.

The deposited lubricant generates an acid such as fluoric acid in some cases, thereby corroding an element section of the magnetic head. In particular, a magnetic head including a magnetoresistive element is readily corroded.

The inventor has discovered the LUL method promotes the above-mentioned problems. The LUL method differs from the CSS method in that a magnetic head slides on a magnetic disk surface without any contact and therefore a lubricant that has migrated and moved to the magnetic head hardly returns to the magnetic disk. In the CSS method, the lubricant is readily removed from the magnetic head because the magnetic head slides on and contacts with a CSS zone of the magnetic disk; hence, the problems hardly occur.

The inventor has conducted further investigation to achieve the above object on the basis of these findings. In particular, the inventor has intensively investigated the lubricant and made the present invention as described below.

The inventor has found out that the above problems can be solved and has led to the completion of the present invention.

The present invention is as described below.

(Constitution 1) A method for producing a lubricant used to form a lubricating layer on a magnetic disk, the method comprising a step of degassing a crude lubricant containing at least one perfluoropolyether and a step of purifying the resulting crude lubricant.

(Constitution 2) A method for producing a lubricant used to form a lubricating layer on a magnetic disk, the method comprising a step of purifying a liquid crude lubricant containing at least one perfluoropolyether by vaporizing the crude lubricant and then liquefying the vapor of the perfluoropolyether within a distance less than the mean free path of molecules of the perfluoropolyether.

(Constitution 3) The method according to Constitution 1 or 2, wherein the purifying step is performed under vacuum conditions.

(Constitution 4) The method according to any one of Constitutions 1 to 3, wherein the lubricant contains at least one compound represented by the following formula:

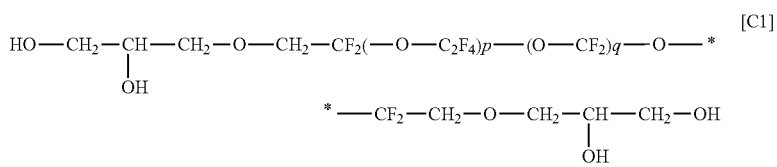

[wherein p and q represent natural numbers]

(Constitution 5) A lubricant, produced by the method according to any one of Constitutions 1 to 4, having a weight-average molecular weight of 4000 to 8000 and a molecular weight distribution of 1 to 1.3.

(Constitution 6) The lubricant according to Constitution 5, wherein the content of the perfluoropolyether in the lubricant is greater than 85%, when the content is measured by nuclear magnetic resonance spectroscopy.

(Constitution 7) A magnetic disk comprising at least a magnetic layer, a protective layer, and a lubricating layer on a substrate, wherein the lubricating layer is formed by applying the lubricant produced on the protective layer by the method according to any one of Constitutions 1 to 4 or by applying the lubricant according to Constitution 5 or 6.

(Constitution 8) The magnetic disk according to Constitution 7, wherein the magnetic disk is installed in a load/unload-type magnetic disk drive.

(Constitution 9) A method for manufacturing a magnetic disk, comprising a step of forming a magnetic layer, a carbonaceous protective layer, and a lubricating layer on a substrate in that order, wherein the carbonaceous protective layer is formed by a plasma-enhanced CVD method and the lubricating layer is formed using the lubricant produced by the method according to any one of Constitutions 1 to 4 or the lubricant according to Constitution 5 or 6.

(Constitution 10) The process according to Constitution 9, wherein the magnetic disk is installed in a load/unload-type magnetic disk drive.

(Constitution 11) A lubricant, used to form a lubricating layer on a magnetic disk, containing a perfluoropolyether and having a molecular weight distribution of 1 to 1.3 or less.

(Constitution 12) The lubricant according to Constitution 11, wherein the weight-average molecular weight thereof is 4000 to 8000.

(Constitution 13) The lubricant according to Constitution 11 or 12, further containing a compound that has a perfluoropolyether chain and a hydroxyl group bonded thereto.

(Constitution 14) A magnetic disk comprising a lubricating layer formed on a surface by the use of the lubricant produced by the method according to any one of Constitutions 1 to 4 or the lubricant according to claim 5 or 6 or the lubricant according to any one of Constitutions 11 to 13.

(Constitution 15) The magnetic disk according to Constitution 14, wherein the magnetic disk is installed in a magnetic disk drive including a magnetic head including a negative pressure slider.

ADVANTAGES

The present invention provides a lubricant for magnetic disks. The lubricant is useful in forming a lubricating layer which is effective to preventing fly stiction and/or corrosion at an extremely small or low flying height of, for example, 10 nm or less, which is prevented from migrating at a high rotational speed of, for example, 5400 rpm or more, and which has high adhesion.

Furthermore, the present invention provides a high-reliability magnetic disk, having a lubricating layer formed using such a lubricant, suitable for the LUL (load/unload) method.

BRIEF DESCRIPTION OF THE DRAWINGS

FIG. 1 is an illustration of an exemplary molecular distillation system.

FIG. 2 is a schematic sectional view of a magnetic disk according to an embodiment of the present invention.

FIG. 3 is a graph showing the relationship between the weight-average molecular weight and molecular weight distribution of lubricants used in Examples and Comparative Examples.

BEST MODE FOR CARRYING OUT THE INVENTION

Embodiments of the present invention will now be described in detail.

A process or method for producing a lubricant for magnetic disks according to a first embodiment of the present invention is characterized in that the lubricant at least contains perfluoropolyether that is degassed and then purified.

The perfluoropolyether contained in the lubricant is preferably an alcohol-modified perfluoropolyether. This is because the alcohol-modified perfluoropolyether has high affinity to a carbonaceous protective layer described below and therefore has an appropriate adhesion thereto.

Examples of the alcohol-modified perfluoropolyether include compounds, such as monools, diols, triols, and tetraols, having various terminal groups. The compounds are different in lubricating properties and/or adhesion from each other depending on the degree of alcohol modification, that is, the number of hydroxyl groups bonded to terminal groups of a perfluoropolyether chain. Therefore, properties of the lubricant vary depending on the content of the alcohol-modified perfluoropolyether, for example, a monool, a diol, a triol, or a tetraol, and/or a process for producing the alcohol-modified perfluoropolyether.

In the present invention, the perfluoropolyether preferably contains a tetraol principally. This is because the lubricant has properties suitable for solving the above problems if the lubricant is produced by the process of this embodiment.

A preferable example of the perfluoropolyether having terminal groups with a tetraol structure is a compound (hereinafter referred to as a perfluorotetraol compound) represented by the following formula:

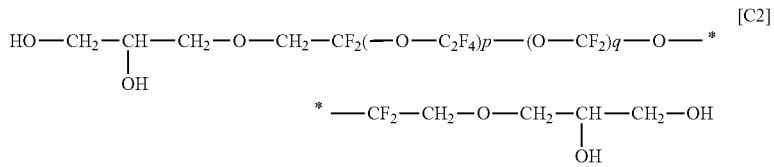

[C2]

[wherein p and q represent natural numbers]

Commercially available examples of an alcohol-modified perfluoropolyether lubricant include Fomblin Z Tetraol (trade name) and Fomblin Z Diol (trade name) available from Solvay Solexis. The former principally contains the perfluoropolyether compound represented by the above formula and the latter principally contains a perfluoropolyether having a terminal group with a diol structure. If these lubricants are produced by the process of this embodiment, preferable lubricating properties can be achieved.

An impurity gas or the like can be removed from the lubricant containing the perfluoropolyether by degassing the lubricant. The resulting lubricant can be highly purified in a purification step subsequent to the degassing step. Since the lubricant is usually liquid at room temperature, the lubricant can be readily degassed in a vacuum atmosphere. If such a vacuum atmosphere is used, the lubricant can be subsequently purified in the vacuum atmosphere. In particular, the lubricant can be readily degassed in such a manner that the lubricant is placed in a vessel and the vessel is then evacuated to a predetermined vacuum pressure with a vacuum pumping system. The vacuum pressure at which the lubricant is degassed is not particularly limited and is preferably about 1 to $1 \times 10^{-3}$ Pa. In the degassing step, it is preferable that the impurity gas be sufficiently removed from the lubricant. Furthermore, the lubricant may be heated to an appropriate temperature during degassing.

The degassed lubricant containing the perfluoropolyether is subsequently subjected to purification. The lubricant is preferably purified by a molecular distillation method described below. Since the molecular distillation method is effective in achieving high distillation efficiency under high-vacuum conditions, the molecular distillation method is suitable for purifying the lubricant, which contains a polymer component. If the lubricant is degassed in a vacuum atmosphere, the lubricant is preferably purified by the molecular distillation method in such a manner that the pressure in the vacuum atmosphere is maintained or further reduced.

In the first embodiment, a method for purifying the lubricant is not limited to the molecular distillation method and the lubricant may be purified by another method such as gel permeation chromatography (GPC) or supercritical extraction.

A method or process for producing a lubricant for magnetic disks according to a second embodiment of the present invention is characterized in that a liquid lubricant at least containing perfluoropolyether is purified in such a manner that the lubricant is vaporized and the vapor of the lubricant is liquefied within a distance less than the mean free path of molecules of the lubricant.

Since the lubricant vapor is liquefied within a distance less than the mean free path of the lubricant vapor molecules as described above, that is, distillation is performed in such a manner that the distance between a vaporization surface (an evaporation surface) and a liquefaction surface (a condensation surface) is maintained less than the mean free path of the lubricant vapor molecules (this technique is herein referred to as molecular distillation), the lubricant vapor molecules are hardly returned to the vaporization surface by collisions therebetween; hence, high distillation efficiency can be obtained. In other words, according to molecular distillation, the lubricant vapor is liquefied before the lubricant vapor molecules collide with other molecules within a distance less than the mean free path of lubricant vapor molecules; hence, distillation can be performed in a non-equilibrium manner (namely, a state remotely shifted from the liquid-vapor equilibrium such that the lubricant vapor is liquefied).

A system for molecular distillation will now be described.

FIG. 1 shows a configuration of a molecular distillation system. The molecular distillation system 20 shown in FIG. 1 includes a feed flask 21, a feed-flask mantle heater 22, a magnetically coupled agitator 23, an agitator control box 24, a distillation column 25, a distillation column mantle heater 26, a residue-receiving flask 27, a distillate-receiving flask 28, a low-boiling-point condensate trap 29, a vacuum gauge 30, and an evacuation unit 32. Reference numeral 31 represents a pipe connected to the evacuation unit 32 and reference numeral 33 represents a control panel for controlling this system.

A lubricant to be subjected to molecular distillation is placed in the feed flask 21. Molecular distillation need not be necessarily performed under vacuum conditions. However, the lubricant is preferably subjected to molecular distillation under vacuum conditions. This is because the molecular distillation of the lubricant under conditions other than vacuum conditions causes an increase in the frequency of collisions of molecules of the vaporized lubricant with other molecules, thereby preventing the liquefaction of the vaporized lubricant within a distance less than the mean free path thereof.

After the lubricant is placed in the feed flask 21, the system is evacuated to a predetermined pressure with the evacuation unit 32. The pressure in the system is preferably $1 \times 10^{-2}$ Pa to $1 \times 10^{-3}$ Pa or may be less than this vacuum range. The pressure therein can be measured with the vacuum gauge 30. Since the system is maintained at high vacuum, degassing described above can be performed in advance. An impurity gas contained in the lubricant flows toward the evacuation unit 32 through the pipe 34 and a portion thereof remains in the low-boiling-point condensate trap 29. The lubricant placed in the feed flask 21 may be heated with the feed-flask mantle heater 22 as required.

After the system is evacuated to a predetermined negative (vacuum) pressure, the lubricant is fed into the distillation column 25 from the feed flask 21. The amount (feed rate) of the lubricant fed into the distillation column 25 from the feed flask 21 can be controlled by adjusting the opening of a cock 35 located in a lower end portion of the feed flask 21. In usual, the feed rate thereof is preferably about 1 to 30 g/min. A reduction in feed rate results in an increase in the time for distillation. In contrast, an increase in feed rate can result in a decrease in the efficiency of distillation.

The lubricant flowing into the distillation column 25 is heated to a predetermined temperature with the distillation column mantle heater 26 disposed outside the distillation column 25 which is cylindrical. The heating temperature of the lubricant depends on the type thereof and is equal to a temperature at which the lubricant is vaporized. The lubricant principally containing the above perfluorotetraol compound is preferably heated to about 100° C. to 220° C. and more preferably 160° C. to 200° C. The heating temperature of the lubricant can be controlled by adjusting the temperature of the distillation column mantle heater 26 and the actual temperature of the lubricant in the distillation column 25 can be measured with a thermometer placed in the distillation column 25.

The magnetically coupled agitator 23 includes a wiper made of, for example, a fluorine-containing resin, extends longitudinally in the distillation column 25, and is operated at a rotation speed of about 20 to 100 rpm in a predetermined direction under control of the agitator control box 24. The rotation of the wiper allows the lubricant to form a thin layer on the inner wall of the distillation column 25. This allows the lubricant to be readily vaporized. The vapor of the lubricant is brought into contact with a cooling rod 36 and therefore liquefied. The resulting lubricant is collected in the distillate-receiving flask 28. Cooling water is fed through an inlet 36a of the cooling rod 36 and then discharged through an outlet 36b thereof, the inlet 36a and the outlet 36b being disposed in a lower region of the cooling rod 36. A residue which is not vaporized and which remains in the residue-receiving flask 27 may be repeatedly subjected to distillation in such a manner that the temperature of the distillation column mantle heater 26 is varied and the residue is then fed into the feed flask 21 again.

The molecular distillation system shown in FIG. 1 is an example and a system for molecular distillation is not limited to this molecular distillation system.

A lubricant produced by the method according to the present invention preferably has a weight-average molecular weight (MW) of 4000 to 8000 and more preferably 4000 to 7000. The lubricant produced by the process preferably has a molecular weight distribution of 1 to 1.3 and more preferably 1 to 1.2, the molecular weight distribution being defined as the ratio of the weight-average molecular weight (Mw) to the number-average molecular weight (Mn). Since the lubricant produced by the process has such a weight-average molecular weight and molecular weight distribution, advantages of the present invention can be achieved.

The lubricant produced by the process principally contains a perfluoropolyether and the content of the perfluoropolyether therein is preferably greater than 85%. When the perfluoropolyether content is 85% or less, any advantages of the present invention cannot be achieved in some cases. According to the process, the lubricant can be produced so as to have high perfluoropolyether content. The content can be determined by NMR (nuclear magnetic resonance) spectroscopy.

Furthermore, the present invention provides a lubricant for forming a lubricating layer on a magnetic disk. This lubricant contains a perfluoropolyether and has a molecular weight distribution of 1.3 or less. Since this lubricant contains a perfluoropolyether and has a molecular weight distribution of 1.3 or less, this lubricant is useful in forming such a lubricating layer which is effective in preventing fly stiction and/or corrosion at an extremely small flying height of 10 nm or less, which is effective in preventing migration at a high rotational speed of, for example, 5400 rpm or more, which has high adhesion.

The lower limit of the molecular weight distribution of this lubricant is not particularly limited and is preferably one or more in order to avoid an increase in the load of a purification step. The molecular weight distribution of this lubricant is preferably 1.25 or less, more preferably 1.2 or less, and most preferably 1.15 or less.

This lubricant preferably has a weight-average molecular weight (Mw) of 4000 to 8000 and more preferably 4000 to 7000. Since this lubricant has such a weight-average molecular weight, advantages of the present invention can be achieved.

This lubricant preferably contains a compound that has a perfluoropolyether chain and at least one hydroxyl group bonded thereto. In particular, this lubricant preferably contains a compound that has a perfluoropolyether chain and hydroxyl groups located at both ends of the chain and more preferably contains the above perfluorotetraol compound. This is because when the molecular weight distribution and/or weight-average molecular weight of this lubricant is as described above, this lubricant has good lubricating properties.

A magnetic disk according to a preferred embodiment of the present invention has a lubricating layer formed by applying a lubricant according to the present invention onto the magnetic disk. The magnetic disk at least includes, on the substrate, a magnetic layer, a protective layer, and the lubricating layer. The lubricating layer can be formed by applying this lubricant onto the protective layer. The protective layer is preferably carbonaceous.

The lubricating layer can be formed by, for example, a dip coating method. The dip coating method is as follows: the magnetic disk having the protective layer is immersed in a solution prepared by dispersing this lubricant in a fluorine-containing solvent, whereby the lubricating layer is formed. In order to allow this lubricating layer to securely adhere to the protective layer, the magnetic disk may be exposed to an atmosphere maintained at 50°C. to 150°C. after being immersed therein.

In the present invention, the lubricating layer preferably has a thickness of 0.5 to 1.5 nm. When the thickness thereof is less than 0.5 nm, the lubricating layer has unsatisfactory lubricating properties in some cases. When the thickness thereof is more than 1.5 nm, fly stiction occurs and/or load/unload (LUL) durability is reduced in some cases.

In the present invention, the protective layer may be carbonaceous. In particular, the protective layer is preferably amorphous and carbonaceous. This is because the protective layer has high affinity to an alcohol-modified perfluoropolyether and an appropriate adhesion. The adhesion thereof can be adjusted in such a manner that the protective layer is prepared from carbon hydride and/or carbon nitride so as to have a desired hydrogen content and/or a desired nitrogen content.

The hydrogen content, which can be determined by hydrogen forward-scattering spectrometry (HFS), is preferably three to 20 atomic percent. The nitrogen content, which can be determined by X-ray photoelectron spectroscopy (XPS), is preferably four to 12 atomic percent.

The protective layer used herein is preferably formed to be amorphous and carbonaceous by a plasma-enhanced chemical vapor deposition method. In particular, the protective layer is preferably made of amorphous carbon hydride. When the protective layer is formed by the plasma-enhanced chemical vapor deposition method, the following hydrocarbon is preferably used: a gaseous lower saturated hydrocarbon or a gaseous linear lower saturated hydrocarbon, such as acetylene, having ten carbon atoms or less in particular.

The magnetic layer preferably contains Co, which is suitable for high density recording. Examples of the magnetic layer include a Co—Pt magnetic layer and a Co—Cr—Pt magnetic layer. The magnetic layer is preferably formed by a DC magnetron sputtering method.

The magnetic disk is suitable for use in a load/unload-type magnetic disk drive. In the case where the magnetic disk is installed in such a load/unload-type magnetic disk drive, problems such as fly stiction and corrosion can be prevented even at an extremely small flying height of, for example, 10 nm or less. The magnetic disk is suitable for use in a magnetic disk drive including a magnetic head including a negative pressure slider (an NPAB slider). This is because such a negative pressure slider is liable to inhale an ordinary lubricant and the lubricating layer readily has high adhesion. A magnetic disk drive including the magnetic disk functions well as a load/unload-type magnetic disk.

EXAMPLES

Examples of the present invention will now be described in detail.

Example 1

FIG. 2 shows a magnetic disk 10 according to an embodiment of the present invention.

The magnetic disk 10 includes a disk substrate 1, a non-magnetic metal layer 2 including a seed sublayer 2a and a base sublayer 2b, a magnetic layer 3, a carbonaceous protective layer 4, and a lubricating layer 5, these layers being arranged on the disk substrate 1 in that order. The lubricating layer 5 is prepared from a lubricant according to the present invention. Detailed description is made below.

(Preparation of Lubricant)

A process for producing the lubricant will now be described.

Fomblin Z Tetraol (trade name) (hereinafter referred to as Lubricant A), principally containing the above perfluorotetraol compound, available from Solvay Solexis was selected for preparation and then purified by the above molecular distillation method. In particular, a molecular distillation system having substantially the same configuration as that shown in FIG. 1 was used. Lubricant A was fed into a feed flask included in the molecular distillation system and the pressure in the molecular distillation system was then reduced to $1 \times 10^{-3}$ Pa with an evacuation unit. The temperature of a mantle heater attached to a distillation column was set to 180° C. Lubricant A placed in the feed flask was sufficiently degassed using a vacuum atmosphere in the molecular distillation system in advance such that an impurity gas or the like contained in Lubricant A was removed.

Resulting Lubricant A was fed into the distillation column from the feed flask at a constant feed rate. In this operation, a wiper disposed in the distillation column was operated at a predetermined rotational speed. The temperature in the distillation column, as well as the temperature of the mantle heater, was 180° C. A distillate was obtained from Lubricant A at 180° C.

The obtained lubricant (hereinafter referred to as Lubricant B) was measured for molecular weight distribution by gel permeation chromatography (GPC) using polymethylmethacrylates having different molecular weights as standard substances. The measurement showed that Lubricant B had a weight-average molecular weight (Mw) of 5130, a number-average molecular weight (Mn) of 4500, and a molecular weight distribution of 1.14. The molecular weight distribution is an index defined as the ratio of the weight-average molecular weight (Mw) to the number-average molecular weight (Mn). The analysis of Lubricant B by NMR (nuclear magnetic resonance) spectroscopy showed that Lubricant B principally contained the perfluorotetraol compound and the content of the perfluorotetraol compound was 90%.

Lubricant B obtained as described above was dispersed in the fluorine-containing solvent Vertrel XF (trade name) available from DuPont-Mitsui Fluorochemicals, whereby a lubricant-containing coating solution was prepared.

The above preparation was performed in a clean room. The cleanliness of the clean room was better than Japanese Industrial Standards (JIS) B9920 Class 6.

(Manufacture of Magnetic Disk)

A 2.5-inch chemically reinforced glass disk (an outer diameter of 65 mm, an inner diameter of 20 mm, and a thickness of 0.635 mm) made of aluminosilicate glass was prepared and then processed into the disk substrate 1. A principal face of the disk substrate 1 was mirror-polished such that Rmax was equal to 4.8 nm and Ra was equal to 0.43 nm.

The seed sublayer 2a, the base sublayer 2b, and the magnetic layer 3 were formed on the disk substrate by a DC magnetron sputtering method in that order.

The seed sublayer 2a was made of a Ni—Al alloy (a Ni content of 50 mole percent and an Al content of 50 mole percent) and had a thickness of 30 nm.

The base sublayer 2b was made of a Cr—Mo alloy (a Cr content of 80 mole percent and a Mo content of 20 mole percent) and had a thickness of 8 nm.

The magnetic layer 3 was made of a Co—Cr—Pt—B alloy (a Co content of 62 mole percent, a Cr content of 20 mole percent, a Pt content of 12 mole percent, and a B content of six mole percent) and had a thickness of 15 nm.

The protective layer 4 (a thickness of 5 nm) made of amorphous diamond-like carbon was subsequently formed by a plasma-enhanced CVD method. In this operation, a gas mixture of nitrogen and acetylene, which was a lower unsaturated hydrocarbon, was used. The analysis of the protective layer 4 by hydrogen forward-scattering spectrometry (HFS) showed that the protective layer 4 was made of carbon hydride nitride and contained 13 atomic percent of hydrogen and eight atomic percent of nitrogen.

The lubricating layer 5 was subsequently formed by a dip coating method using the lubricant-containing coating solution prepared as described above.

After the lubricating layer was formed, the magnetic disk 10 was heated at 130° C. for 90 minutes in a vacuum oven, whereby the lubricating layer was bonded to the protective layer 4. The lubricating layer 5 was measured with a Fourier transform infrared spectrometer (FTIR). The measurement showed that the lubricating layer 5 had a thickness of 1 nm. According to the above procedure, the magnetic disk of the present invention was obtained.

(Evaluation of Magnetic Disk)

[Lubricating Layer Adhesion Test]

The obtained magnetic disk was immersed in the fluorine-containing solvent (Vertrel XF described above) for one minute. In the immersion of the magnetic disk in the fluorine-containing solvent, a week portion of the lubricating layer that has low adhesion was dissolved in the fluorine-containing solvent but a strong portion of the lubricating layer that has high adhesion was allowed to remain on the protective layer. The magnetic disk was taken out of the fluorine-containing solvent at a rate of 6 cm/min and the lubricating layer was measured for thickness with an FTIR spectrometer. The ratio of the thickness of the treated lubricating layer to the thickness of the untreated lubricating layer is referred to as a lubricating-layer adhesion ratio (namely, bonded ratio). An increase in bonded ratio leads to an increase in the adhesion of the lubricating layer to the protective layer. If the flying height is extremely small, that is, if the flying height is 10 nm or less when the LUL method is used, the bonded ratio is preferably greater than 80%. The magnetic disk of this example had a bonded ratio of 85%.

[Measurement of Lubricating Layer Coverage]

The coverage of the lubricating layer was determined in such a manner that the average thickness of the lubricating layer was measured by X-ray photoelectron spectroscopy. In the magnetic disk of this example, the lubricating layer had a coverage of 95%.

[LuL Durability Test]

In order to investigate the LUL (load/unload) durability of the obtained magnetic disk 10, the magnetic disk 10 was subjected to an LUL durability test.

An LUL-type HDD (hard disk drive) (rotatable at 5400 rpm) was prepared. A 10-nm flying-height magnetic head and the magnetic disk of this example were installed in the HDD. The magnetic disk included an NPAB slider and a magnetoresistive reproducing element (GMR element). A shield section was made of Fe—Ni permalloy. The following number was counted: continuous LUL operation was repeated a great number of times in connection with the LUL-type HDD until the magnetic disk was damaged.

As a result, the magnetic disk of this example was able to endure the LUL operation nine hundred thousand times without being damaged. It is known that it takes about ten years that the number of times the LUL operation is performed in usual HDDs under ordinary conditions exceeds four hundred thousand. Hence, the magnetic disk of this example can be evaluated to be reliable.

No fly stiction occurred in any tested HDDs.

The magnetic head and magnetic disk subjected to the LUL durability test were investigated in detail with an optical microscope and an electron microscope. The investigation showed that the magnetic head and the magnetic disk had no damages or corroded portions. Furthermore, the investigation showed that the magnetic head had no lubricant stains.

Example 2

In this example, Lubricant A described above was purified by molecular distillation in such a manner that the temperature of the distillation column mantle heater was set to 200° C. A lubricant was prepared in this example in substantially the same manner as that described in Example 1 except the temperature of the distillation column mantle heater. The obtained lubricant had a weight-average molecular weight (Mw) of 6900, a number-average molecular weight (Mn) of 6000, and a molecular weight distribution of 1.15. The analysis of the lubricant by NMR showed that the lubricant principally contained the perfluorotetraol compound and the content thereof was 92%.

Magnetic disks were prepared using the lubricant in substantially the same manner as that described in Example 1. The obtained magnetic disks were evaluated in substantially the same manner as that described in Example 1. The evaluation showed that the magnetic disks had a bonded ratio of 84% and the lubricant had a coverage of 95%. The LUL durability test thereof showed that the magnetic disks of this example were able to endure the LUL operation nine hundred thousand times without being damaged. Therefore, the magnetic disks of this example can be evaluated to be reliable.

No fly stiction occurred in any tested HDDs.

Magnetic heads and the magnetic disks subjected to the LUL durability test were investigated in detail with an optical microscope and an electron microscope. The investigation showed that the magnetic heads and the magnetic disks had no damages or corroded portions. Furthermore, the investigation showed that the magnetic heads had no lubricant stains.

Example 3

In this example, Lubricant A described above was purified by molecular distillation in such a manner that the temperature of the distillation column mantle heater was set to 170° C. A lubricant was prepared in this example in substantially the same manner as that described in Example 1 except the temperature of the distillation column mantle heater. The obtained lubricant had a weight-average molecular weight (Mw) of 4800, a number-average molecular weight (Mn) of 4180, and a molecular weight distribution of 1.15. The analysis of the lubricant by NMR showed that the lubricant principally contained the perfluorotetraol compound and the content thereof was 95%. A magnetic disk was prepared using the lubricant in substantially the same manner as that described in Example 1. The obtained magnetic disk was evaluated in substantially the same manner as that described in Example 1. The evaluation showed that the magnetic disk had a bonded ratio of 85% and the lubricant had a coverage of 92%. The LUL durability test showed that the magnetic disk of this example was able to endure the LUL operation nine hundred thousand times without being damaged. Therefore, the magnetic disk of this example can be evaluated to be reliable.

Example 4

In this example, Lubricant A described above was purified by molecular distillation in such a manner that the temperature of the distillation column mantle heater was set to 160° C. A lubricant was prepared in this example in substantially the same manner as that described in Example 1 except the temperature of the distillation column mantle heater. The obtained lubricant had a weight-average molecular weight (Mw) of 4200, a number-average molecular weight (Mn) of 3820, and a molecular weight distribution of 1.10. The analysis of the lubricant by NMR showed that the lubricant principally contained the perfluorotetraol compound and the content thereof was 86%. A magnetic disk was prepared using the lubricant in substantially the same manner as that described in Example 1. The obtained magnetic disk was evaluated in substantially the same manner as that described in Example 1. The evaluation showed that the magnetic disk had a bonded ratio of 82% and the lubricant had a coverage of 92%. The LUL durability test showed that the magnetic disk of this example was able to endure the LUL operation nine hundred thousand times without being damaged. Therefore, the magnetic disk of this example can be evaluated to be reliable.

Comparative examples will now be described in comparison with the above examples.

Comparative Example 1

In this comparative example, Lubricant A described above was purified by supercritical extraction. That is, Lubricant A was purified with a supercritical fluid extraction system including a supercritical fluid feeder, a temperature adjuster, and a pressure adjuster. A mobile phase in supercritical extraction was a carbon dioxide eluent. Carbon dioxide can be rendered supercritical in such a manner that carbon dioxide is maintained at a pressure of 80 to 350 $kgf/cm^2$ and a temperature of 35° C. to 300° C. The elution of a lubricant from a column was monitored with a Fourier transform infrared spectrometer (FTIR), an ultraviolet absorption spectrometer, or the like. Lubricant A was fractionated on the basis of retention time while being monitored; hence, fractions having desired molecular weights were obtained. In this comparative example, Lubricant A was not degassed.

The obtained lubricant had a weight-average molecular weight (Mw) of 7340, a number-average molecular weight (Mn) of 5600, and a molecular weight distribution of 1.31. The analysis of the lubricant by NMR showed that the lubricant principally contained the perfluorotetraol compound and the content thereof was 85%.

Magnetic disks were prepared using the lubricant in substantially the same manner as that described in Example 1. The obtained magnetic disks were evaluated in substantially the same manner as that described in Example 1. The evaluation showed that the magnetic disks had a bonded ratio of 80% and the lubricant had a coverage of 92%. The magnetic disks were subjected to substantially the same LUL durability test as that described in Example 1. The test showed that the magnetic disks of this comparative example were damaged due to head crush after LUL operation was repeated three hundred thousand times. Fly stiction occurred in 40% of tested HDDs. Magnetic heads and the magnetic disk subjected to the LUL durability test were investigated. The investigation showed that the magnetic heads and the magnetic disks had scratches due to head crush. Furthermore, the investigation showed that NPAB pocket sections and/or ABS faces of the magnetic heads were stained with the lubricant.

Comparative Example 2

In this comparative example, Lubricant A described above was not purified or degassed. Lubricant A had a weight-average molecular weight (Mw) of 6000, a number-average molecular weight (Mn) of 4510, and a molecular weight distribution of 1.33. The analysis of the lubricant by NMR showed that the lubricant principally contained the perfluorotetraol compound and the content thereof was 79%.

Magnetic disks were prepared using the lubricant in substantially the same manner as that described in Example 1. The obtained magnetic disks were evaluated in substantially the same manner as that described in Example 1. The evaluation showed that the magnetic disks had a bonded ratio of 78% and the lubricant had a coverage of 90%. The magnetic disks were subjected to substantially the same LUL durability test as that described in Example 1. The test showed that the magnetic disks of this comparative example were damaged due to head crush after LUL operation was repeated two hundred thousand times. Fly stiction occurred in 50% of tested HDDs.

Table 1 summarizes the results of the magnetic disks evaluated in Examples 1 to 4 and Comparative Examples 1 and 2. FIG. 3 shows the relationship between the weight-average molecular weight and molecular weight distribution of the lubricants used in the examples and the comparative examples.

TABLE 1

|  | Purification Method | Heating Temperature | Weight-average Molecular Weight | Molecular Weight Distribution | Content of Principal Component | Bonded Ratio | Lubricant Coverage | LUL Durability | Fly Stiction Test-passing Percentage |
|---|---|---|---|---|---|---|---|---|---|
| Example 1 | Molecular Distillation Method | 180 | 5130 | 1.14 | 90% | 85% | 95% | Durable until 900,000 times | 100% |
| Example 2 | Molecular Distillation Method | 200 | 6900 | 1.15 | 92% | 84% | 95% | Durable until 900,000 times | 100% |
| Example 3 | Molecular Distillation Method | 170 | 4800 | 1.15 | 95% | 85% | 92% | Durable until 900,000 times | 100% |
| Example 4 | Molecular Distillation Method | 160 | 4200 | 1.10 | 86% | 82% | 92% | Durable until 900,000 times | 100% |
| Comparative Example 1 | Supercritical Extraction | — | 7340 | 1.31 | 85% | 80% | 92% | Damaged after 300,000 times | 60% |
| Comparative Example 2 | Not Purified (A crude lubricant was used) | — | 6000 | 1.33 | 79% | 78% | 90% | Damaged after 200,000 times | 50% |

Table 1 shows that the lubricants of the examples are effective in preventing the occurrence of fly stiction at an extremely small flying height of 10 nm when the LUL method is used and also shows that the magnetic disks of the examples are superior in LUL durability and suitable for the LUL method. In contrast, the lubricants of the examples cannot completely prevent the occurrence of fly stiction and the magnetic disks of the comparative examples are inferior in LUL durability and are therefore unsuitable for practical use.

The same treatment and evaluation as those described in the examples were performed except that a perfluoropolyether lubricant containing a diol having a terminal group with a diol structure was used. As a result, advantages of the present invention were obtained.

The invention claimed is:

1. A lubricant for use in manufacturing a magnetic disk, comprising a compound represented by the following formula:

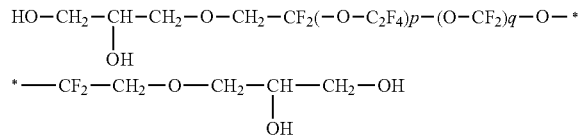

wherein the lubricant is prepared by a method comprising the following steps:
preparing a crude lubricant which includes at least the compound;
heating the crude lubricant to a temperature of 160° C. to 200° C.;
degassing an impurity gas from the crude lubricant in a reduced pressure;
after the degassing, vaporizing a degassed lubricant into a vaporized lubricant; and
purifying the vaporized lubricant into the lubricant by liquefying the compound molecules of the vaporized lubricant within a distance less than a mean free path of the compound molecules.

2. A magnetic disk comprising at least a magnetic layer, a protective layer, and lubricant layer which are formed on a substrate, wherein the lubricant layer comprises the lubricant according to claim 1.

3. The lubricant for use in manufacturing a magnetic disk according to claim 1, wherein the compound comprises at least 85 mole percent of the lubricant, as measured by nuclear magnetic resonance spectroscopy.

4. The lubricant for use in manufacturing a magnetic disk according to claim 1, wherein the compound comprises between 90 and 95 mole percent of the lubricant, as measured by nuclear magnetic resonance spectroscopy.

5. The lubricant according to claim 1, in which the molecular weight distribution is not smaller than 1.0 and is not greater than 1.3, and in which the weight-average molecular weight is between 4000 and 8000.

6. The magnetic disk according to claim 2, wherein the compound comprises at least 85 mole percent of the lubricant, as measured by nuclear magnetic resonance spectroscopy;
the molecular weight distribution of the lubricant is not smaller than 1.0 and is not greater than 1.3; and
the weight-average molecular weight of the lubricant is between 4000 and 8000;
wherein the lubricant layer is formed by dip coating.

7. The magnetic disk according to claim 6, wherein the compound comprises between 90 and 95 mole percent of the lubricant, as measured by nuclear magnetic resonance spectroscopy.

8. The magnetic disk according to claim 6, wherein the bonded ratio is greater than 80%.

9. The magnetic disk according to claim 6, wherein the bonded ratio is between 82 and 85%.

10. The magnetic disk according to claim 6, installed in a magnetic disk drive of a load/unload type.

11. The magnetic disk according to claim 10, installed in the magnetic disk drive which comprises a magnetic head including a negative pressure slider.

* * * * *